United States Patent Office

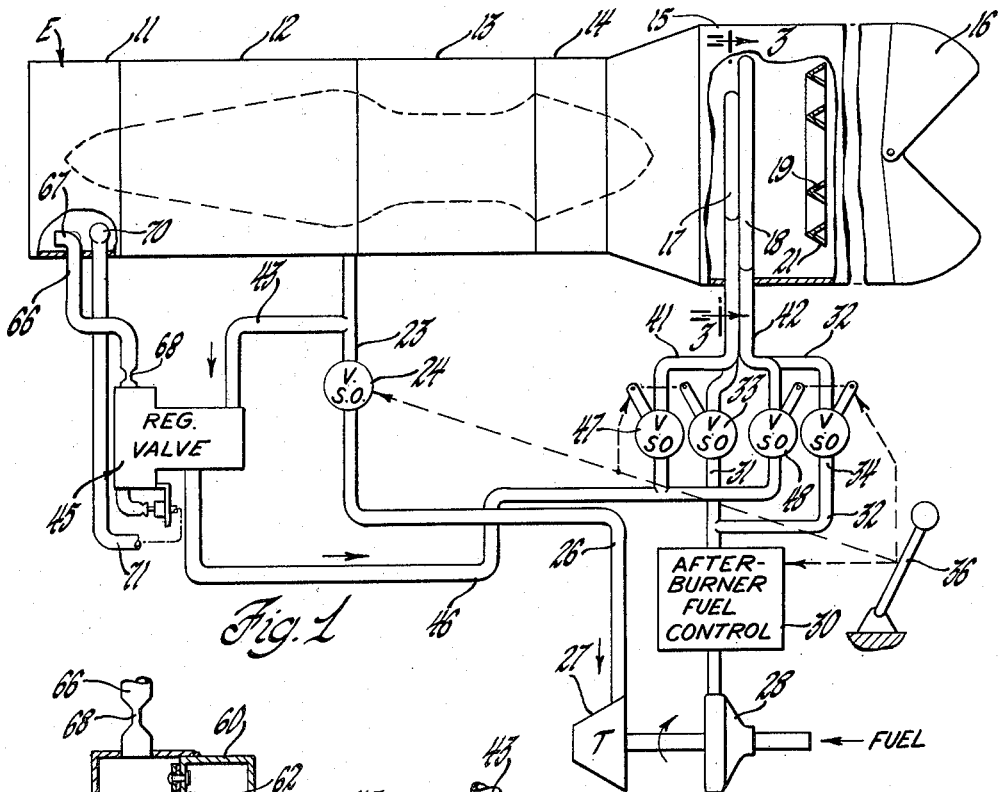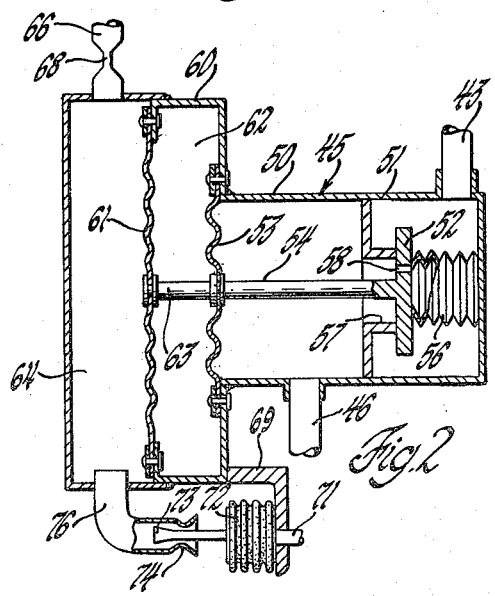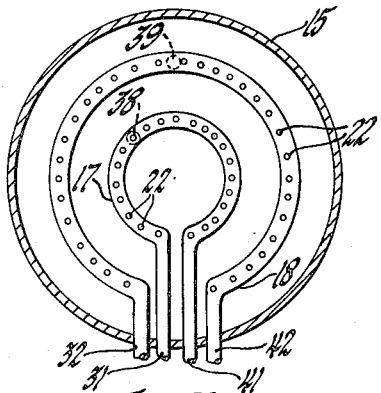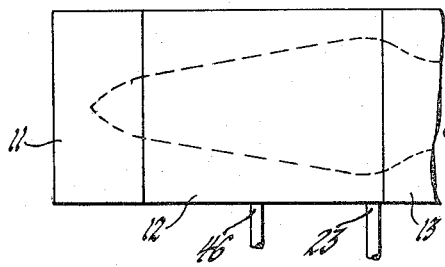

3,158,998
Patented Dec. 1, 1964

3,158,998
AUTOMATIC CONTROL FOR AFTERBURNER
MANIFOLD UTILIZING TWO FLUIDS
Lester L. Robinson and Bernard E. Erickson, Indianapolis, Ind., assignors to General Motors Corporation, Detroit, Mich., a corporation of Delaware
Filed Sept. 4, 1962, Ser. No. 221,266
13 Claims. (Cl. 60—35.6)

Our invention relates to fuel burners for jet engine afterburners, ramjet engines, and the like, and particularly to the means for injecting or operating fuel into such devices. It also relates, more generally, to spraying of liquids or carburetion.

The preferred embodiment of the invention is in a fuel manifold arrangement for an afterburner, and it will be so described. The applicability of the invention to other uses will be apparent.

Development of afterburners for turbojet engines has led to various devices to increase the flexibility, that is, to increase the range of fuel flow and therefore the range of thrust augmentation which may be had. This is a problem because combustion cannot be supported unless the ratio of fuel to air (or combustion products) is within certain limits. Early afterburners mixed fuel with the entire engine exhaust flow and, therefore, the minimum levels of fuel flow and of thrust augmentation were quite high. Later developments involved use of plural manifolds so that a combustible mixture could be generated by spraying fuel from one manifold so as to mix with the gas flow of only part of the afterburner duct. This is referred to as "zone" burning.

Our invention is directed to means to permit fuel to be sprayed from varying portions of a manifold for fuel supply and fuel-air ratio control. For example, if a tubular manifold has a number of spray orifices, a very wide range of fuel flow modulation can be had if the number of spray orifices through which fuel flows can be varied widely.

According to our invention, the manifold has a number of spray ports and, by suitable controls, the number of effective ports can be varied at will so that anything from a very small part of the manifold to the entire manifold is effective to spray fuel.

Another significant feature or advantage of our invention lies in the fact that it also provides for controlling the pressure drop across the spray orifices independently of the rate of flow of fuel. In the ordinary fuel manifold of fixed configuration, the rate of flow of fuel through the spray orifices is proportional to the square root of the pressure drop through the orifices. Thus, if there is a considerable range of flow through each orifice, there must be a wide range of pressure. It is also true that a considerable pressure drop is needed for effective atomization. Therefore, if there are many spray orifices, a small flow cannot be discharged properly since the pressure drop becomes too low for effective atomization. In accordance with our invention, the pressure drop is held at the desired level to secure effective atomization, and it may also be modulated in accordance with the density of air or gas to maintain a desired local ratio of weight of fuel to weight of air, making allowance for variations in air pressure or density.

These very important advantages are achieved in the preferred embodiment of the invention by providing for flow of fuel into one end of a spray bar or manifold and of air into the other end, and providing a shiftable plug or piston, which may be a ball, within the manifold to provide a barrier between the fuel and the air or other gas. Some form of control of the air pressure is also involved so that the air pressure acting through the plug confines the discharge of fuel to a suitable number of holes to provide proper atomization and usually the desired local fuel-air ratio. In the case of a jet engine afterburner, this control preferably responds to density of the air entering the engine which is a suitable index of mass air flow. However, in some cases, it may be sufficient merely to maintain an air pressure within the manifold a more or less constant amount above the air pressure within the afterburner or other space into which a liquid is sprayed.

The nature and advantages of the invention will be more clearly apparent from the succeeding detailed description thereof and the accompanying drawings.

FIGURE 1 is a schematic diagram of an afterburning turbojet engine including an afterburner fuel supply installation according to the invention.

FIGURE 2 is a somewhat schematic representation of a regulating valve controlling manifold air pressure.

FIGURE 3 is a transverse sectional view of the afterburner taken on the plane indicated by the line 3—3 of FIGURE 1.

FIGURE 4 is a fragmentary view illustrating a modification.

Referring to FIGURE 1, there is illustrated conventionally a turbojet engine E of usual type comprising an air inlet 11, compressor 12, combustion apparatus 13, turbine 14, and an exhaust duct 15 terminating in a variable area jet nozzle 16. The exhaust duct 15 houses an afterburner which consists primarily of two fuel spray manifolds 17 and 18 and flame holding gutters 19 and 21. As will be apparent, the manifolds 17 and 18 are approximately circular and are of different diameters so that manifold 17 distributes fuel near the axis of the afterburner and manifold 18 nearer the wall. These manifolds are provided with fuel spray orifices or nozzles 22 in accordance with usual practice.

The supply of fuel to the afterburner may be controlled in accordance with known practice by any suitable manually controllable afterburner fuel supply system. As illustrated schematically, compressed air is taken from the outlet of compressor 12 through a pipe 23, a shut-off valve 24, and a pipe 26 to an air turbine 27 which drives an afterburner fuel pump 28. The fuel pump delivers fuel to the manifolds 17 and 18 through an afterburner fuel control 30 and lines 31 and 32 which include shut-off valves 33 and 34. A manual control lever 36, which may be operated by the aircraft pilot, is connected to the afterburner fuel control to determine the level of thrust augmentation and to the shut-off valves 33 and 34. Valve 24 is opened whenever the lever 36 is moved to supply fuel. The amount of fuel, or more particularly the fuel-air ratio of the afterburner, is varied progressively as the lever 36 is moved farther from its starting position. The control 30 normally responds both to lever 36 and to some parameters indicative of engine air flow. Shut-off valve 33 is opened at the initiation of afterburning, and fuel is supplied to manifold 17 during all afterburning operation. Valve 34 is opened to supply fuel also to manifold 18 at the higher levels of thrust augmentation. The arrangement of the valves 33 and 34 and their relation to the control lever may be more sophisticated, but that described is sufficient to provide background for explanation of our invention.

In the usual prior art afterburner, fuel would be discharged through all of the orifices 22 of each manifold whenever the manifold is supplied with fuel. In accordance with our invention, the manifolds are of constant diameter tubing and balls 38 and 39, which are but slightly smaller than the inside diameter of the manifolds, are slidably or rollably mounted within the manifolds. It is not essential that the blocking device be a ball but this is desirable particularly in a curved manifold. In a straight manifold, a more usual type of piston might be employed. In an afterburner, because of the temperature levels which are involved, the use of seals on the plug or piston is not particularly feasible. In applications of the invention to devices operating at more reasonable temperatures, a sealed piston might be employed. To sum it up, the ball seems to be the best type of piston or plug for this particular environment.

The air inlet lines 41 and 42 are connected to the ends of manifolds 17 and 18 opposite to the fuel inlets. These lines are supplied with air under controlled pressure. As shown, the air is taken from the compressor outlet through a branch 43 of the compressed air line 23, through a pressure regulating valve 45, to be described, a regulated pressure line 46, and shut-off valves 47 and 48 to the lines 41 and 42. Valves 47 and 48 are coupled, respectively, to valves 33 and 34 so as to be opened with them. There is no point in supplying air to the manifold except when fuel is supplied.

FIGURE 2 illustrates schematically a regulating valve 45 suitable to control the air pressure in the manifold to maintain it substantially proportional to air flow. The valve 45 comprises a case 50 to which the compressed air line 43 and the regulated pressure line 46 are connected. A valve seat 51 between the two lines cooperates with a valve tappet 52. The tappet 52 moves in response to pressure in line 46 and a control pressure. A diaphragm 53 in the body is fixed to the stem 54 of the tappet 52 and is exposed to regulated air pressure so that this pressure tends to close the regulating valve. The pressure across the tappet is balanced. A bellows 56 mounted between the case and the tappet end of area equal to the opening 57 in the seat communicates with regulated pressure through an aperture 58 in the tappet. The action of the valve is therefore uninfluenced by pressure from the inlet line 43. The body 50 of the valve includes a cylindrical portion 60 of larger diameter than the diaphragm 53, within which is mounted a second diaphragm 61. These diaphragms are airtight and the space 62 between them is evacuated. A stem 63 extending from the diaphragm 61 bears against the end of stem 54. Thus, the pressure in the chamber 64 to the left of diaphragm 61 tends to open the line to supply air to the line 46. The pressure against the larger diaphragm 61 is balanced against the regulated air pressure acting on the smaller diaphragm 53 so that the pressure in line 46 is some multiple such as three or four times the pressure in chamber 64. Chamber 64 is connected through a line 66 to a total pressure probe 67 in the engine inlet. An orifice 68 is fitted in this line.

The structure so far described would maintain the pressure of air in the line 46 at a definite multiple of the pressure in the engine inlet. This is one of the factors that determines engine air flow, another being inlet temperature, and still another being engine speed. It is desirable in order to reach a close approximation of air flow to correct for air temperature, but, in the usual afterburner engine, the afterburner is supplied only at full rated speed of the engine so no speed correction is needed. A sufficiently accurate correction of pressure for the temperature factor in air density may be accomplished by controlled bleeding of air from chamber 64 in response to the temperature in the engine air inlet. For this purpose, an inlet temperature bulb 70 is connected through a line 71 to a bellows 72 mounted on a bracket 69 extending from the valve case 50. This bellows controls a needle valve 73 which variably throttles a restriction 74 in an outlet 76 from chamber 64. As temperature increases, orifice 74 is enlarged and the pressure in chamber 64 is reduced in response to increased drop through orifice 68. By suitable contouring of needle 73, the pressure in chamber 64 may be corrected so as to be approximately proportional to inlet pressure divided by absolute inlet temperature, that is, to density.

In the operation of the fuel system, the control lever 36 is moved, opens valves 24, 33 and 47, and causes the afterburner fuel control 30 to supply fuel to the manifold 17. Fuel controlled as to quantity and air controlled as to pressure will be supplied to the opposite ends of manifold 17. Since the quantity of fuel is controlled, the fuel will push the ball or piston 38 away from the fuel inlet 31 until enough spray orifices 22 are opened to reduce the fuel pressure to equal the pressure of the air supplied to the manifold. If the fuel supply rate is increased, pressure will rise, causing the ball to move and open more orifices for fuel spray. The orifices 22 which do not discharge fuel will discharge air into the afterburner. If the air density entering the engine increases, the pressure in line 41 will increase, causing the ball 38 to move toward the fuel inlet. With the same fuel flow, the fuel would be concentrated in a smaller area to maintain approximately the same local ratio of fuel to air.

At higher levels of fuel supply, manifold 18 is also employed. This manifold may be energized at some position of the lever 36. Alternatively, it could be energized by means responsive to some condition indicative of complete utilization of manifold 17 such as movement of ball 38 to the air end of the manifold or a substantial shut-off of air flow to the manifold. Valves 48 and 34 might also respond to a pressure rise in manifold 17.

It will be apparent that some of the refinements of the invention could be eliminated while retaining many of its advantageous features. For example, a simple regulating valve could be used to provide constant pressure drop across the spray nozzles. If it is considered unnecessary to maintain a constant local ratio of liquid to gas, the air or gas pressure in the manifolds could simply be maintained at some constant value above the pressure in duct 15. Suitable mechanisms for this purpose are obvious; for example, a valve such as that shown in FIGURE 2 in which the valve is closed by means responsive to pressure in the manifold and opened by means responsive to pressure in the duct plus a spring to maintain a constant differential could obviously be employed. Such a valve could be provided merely by eliminating diaphragm 61 and outlet 76 from valve 45, connecting the inlet line 66 to the duct 15, and providing a spring biasing diaphragm 53 in the direction to open the valve.

Another simplified approach to controlling the supply of fuel is indicated by FIGURE 4 in which compressed air line 46 is connected to an intermediate stage of the compressor of an afterburning engine. In other words, the engine, including the afterburner, might be the same as that of FIGURE 1, but regulating valve 45 would be eliminated. The pressure in the afterburner 15 ordinarily is a fairly definite fraction of the compressor discharge pressure. By providing the tap for the line 46 at a suitable stage of the compressor, the pressure in line 46 may be maintained approximately proportional to exhaust duct pressure and sufficiently higher to provide the desired pressure drop for atomization. With this arrangement, the pressure differential is proportional to the general pressure level. Any decrease in the pressure drop available to force in fuel through the spray orifices would be roughly proportional to the engine intake pressure and therefore roughly proportional to afterburner pressure.

It will be seen, therefore, that many types of controls are possible, depending upon the characteristics of the engine or other device in which the spray manifold or manifolds are used and the degree of refinement desired. Any suitable means responsive to pressure in the exhaust duct, to engine air flow, or to air density may be employed to bias valve 45 and thus determine the air pressure level in the manifold. Our invention does not relate primarily to the air pressure control and fuel control devices per se; any suitable known devices may be used.

It will be clear to those skilled in the art that our invention makes it possible to vary fuel flow from a manifold through a very wide range without undesirably changing the fuel spray pressure differential. It also makes it possible to vary this differential without changing fuel flow. The invention is particularly suited to the requirements of fully modulated afterburners but, of course, has many other fields of use.

The description of the preferred embodiment of the invention for the purpose of explaining the principles thereof is not to be considered as limiting or restricting the invention.

We claim:

1. An afterburning gas turbine engine including a compressor, combustion apparatus, and a turbine, an exhaust duct, an afterburner fuel manifold in the duct, the manifold being double-ended and having fuel discharge ports distributed along the manifold, means for supplying fuel at a variable rate to one end of the manifold, means for supplying a gas at controlled pressure to the other end of the manifold, and a plug slidable within the manifold effective to provide a barrier between the fuel and the gas.

2. An engine as recited in claim 1 in which the gas supplying means is responsive to a condition indicative of gas flow in the duct.

3. An engine as recited in claim 1 in which the gas supplying means is responsive to a condition indicative of gas pressure in the duct.

4. An engine as recited in claim 1 in which the gas supplying means includes pressure control means responsive to a condition indicative of gas flow in the duct.

5. A fuel spray system for a reaction engine comprising, in combination, a double-ended fuel manifold having fuel discharge ports distributed along the manifold, means for supplying fuel at a variable rate to one end of the manifold, means for supplying a gas at controlled pressure to the other end of the manifold, and a plug slidable within the manifold effective to provide a barrier between the fuel and the gas.

6. A fuel spray system as recited in claim 5 including also a gas flow duct in which the manifold is mounted.

7. A fuel spray system as recited in claim 6 in which the gas supplying means includes pressure control means responsive to a condition indicative of gas flow in the duct.

8. A fuel spray system as recited in claim 6 in which the gas supply means includes pressure control means responsive to a condition indicative of gas pressure in the duct.

9. A liquid spraying system comprising, in combination, regulatable means for supplying a liquid under pressure at varying rates, a tubular liquid spray manifold having liquid outlets distributed along its length, means for supplying a gas under controlled pressure, the manifold having one end connected to the liquid supplying means and one end connected to the gas supplying means, and a freely movable piston in the manifold moved by pressure differential across the piston effective to provide a displaceable barrier between the liquid and gas.

10. A system as recited in claim 9 in which the piston is a sphere.

11. A liquid spraying system as recited in claim 9 including also a gas flow duct in which the manifold is mounted.

12. A liquid spraying system as recited in claim 11 in which the gas supplying means includes pressure control means responsive to a condition indicative of gas flow in the duct.

13. A liquid spraying system as recited in claim 11 in which the gas supplying means includes pressure control means responsive to a condition indicative of gas pressure in the duct.

References Cited in the file of this patent

UNITED STATES PATENTS

| 1,532,260 | Osthoff | Apr. 7, 1925 |
| 2,794,598 | Waterfill | June 4, 1957 |
| 2,880,752 | Kreuttner | Apr. 7, 1959 |
| 2,944,388 | Bayer | July 12, 1960 |
| 2,984,970 | Bertaux | May 23, 1961 |
| 2,993,338 | Wilsted | July 25, 1961 |

FOREIGN PATENTS

| 527,476 | Germany | June 18, 1931 |
| 330,400 | Switzerland | June 15, 1958 |